Jan. 29, 1924.  
E. HIATT  
ADJUSTABLE VISOR  
Filed Dec. 15, 1921

Elmer Hiatt  
Inventor

By Lancaster and Allwine  
Attorneys

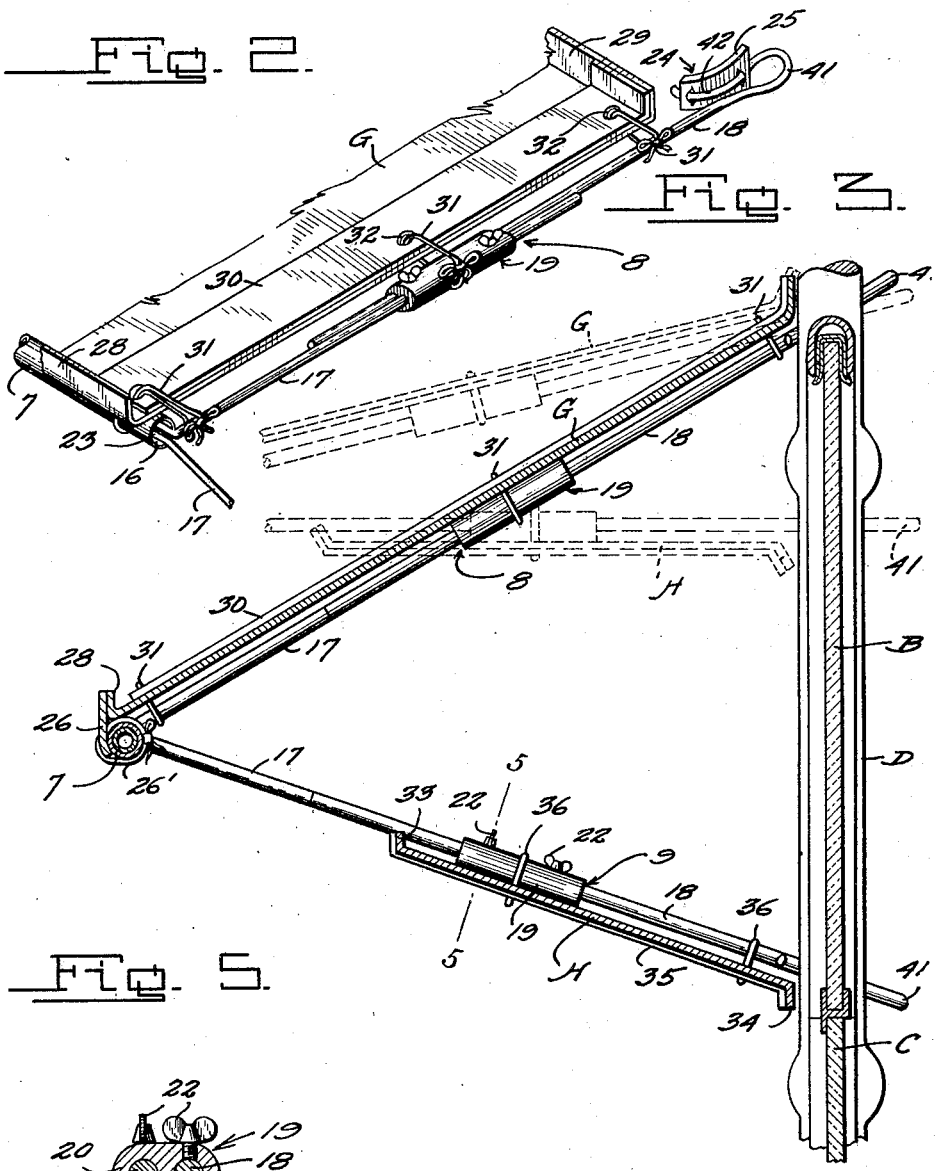

Patented Jan. 29, 1924.

1,482,078

UNITED STATES PATENT OFFICE.

ELMER HIATT, OF NEWCASTLE, INDIANA.

ADJUSTABLE VISOR.

Application filed December 15, 1921. Serial No. 522,529.

*To all whom it may concern:*

Be it known that I, ELMER HIATT, a citizen of the United States, residing at Newcastle, in the county of Henry and State of Indiana, have invented certain new and useful Improvements in Adjustable Visors, of which the following is a specification.

The present invention relates to visors particularly well adapted for use in connection with motor vehicles, and having the dual function,—a guard for the wind shield and a non-glare device to prevent impaired vision of the driver even though facing strong headlights or the sun when near the horizon.

Many accidents in which motor vehicles were involved was due either to a dimming plane in the line of vision of the driver, such as an ordinary wind shield on which rain water, snow or ice has accumulated, or from an impaired vision suddenly resulting from a strong light facing the driver. While many devices have been proposed and to some extent brought into use with the view of avoiding these difficulties they have, generally speaking sought to solve either one or the other of these problems. A motorist desiring to equip his vehicle with these safe guards must have two accessories as a rule, operable independently of one another. One of the principal objects of my invention is therefore to provide a single unit having the dual function above set forth, which may be readily attached to a motor vehicle of either the so-called open or closed type, and which may be easily adjusted as to position and maintained in good condition even though subjected to the vibration incident to travel over the highways and wind forces coming thereupon.

Another object of the present invention is to provide a visor which is adjustable not only as to position on any particular vehicle but which may be carried in stock by merchants and adjusted to fit various makes and models of vehicles without the necessity of stocking several sizes.

Other objects of the invention are, to provide a visor which may be adjusted so as to not interfere with the opening of the windshield,—regular equipment of the vehicle, as when driving during fair weather, when the visor may act as a sun shield to make driving less fatiguing; which may be quickly adjusted by a person within the vehicle to act as a guard for the regular windshield during a storm, and which may be readily adjusted to provide a slit or space through which the line of vision may be directed not to pass through a transparency of the visor as for normal driving at night or late afternoon, but so positioned that by a slight movement of the head of the driver, the line of vision may be directed through the transparency of a non-glare character, to avoid blinding.

Another object of the invention is to provide a visor which is inexpensive to manufacture, relatively light in weight but firm when properly adjusted to any particular vehicle, and which will hold its position without marring parts of the vehicle.

Other objects and advantages of the invention will appear in the following detailed description, taken in connection with the accompanying drawings, forming a part of this specification, and in which drawings:

Figure 2 is an enlarged fragmentary perspective view of one end portion of the visor.

Figure 3 is a detailed view, partly in vertical section and elevation through the visor and a portion of the wind shield of the vehicle.

Figure 5 is an enlarged cross sectional view on the line 5—5 of Figure 3 through another adjustable portion of the frame.

Figure 1:
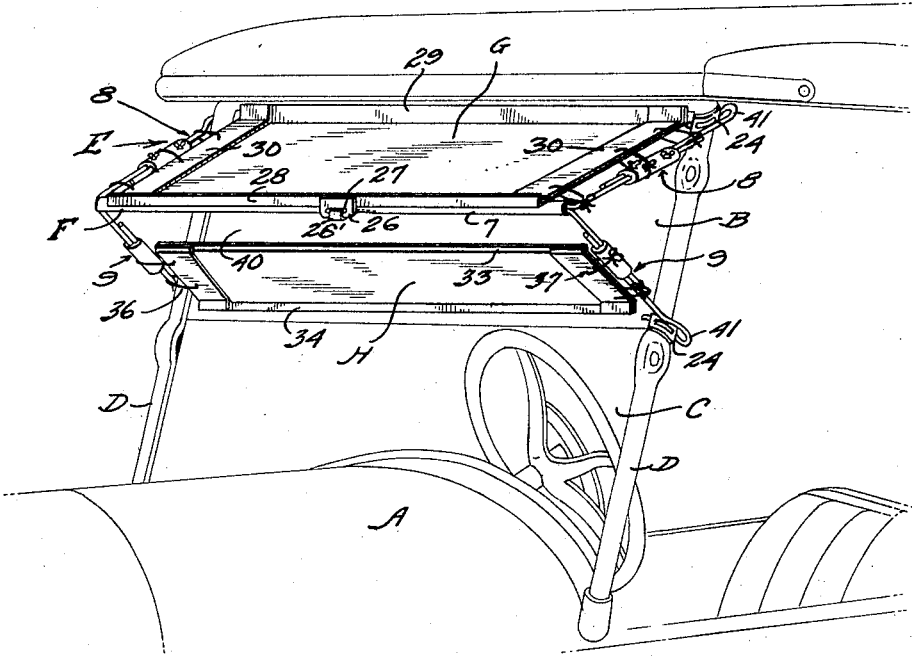
Figure 1 is a perspective view of a portion of a motor vehicle equipped with a visor constructed according to the present invention.
Figure 4:
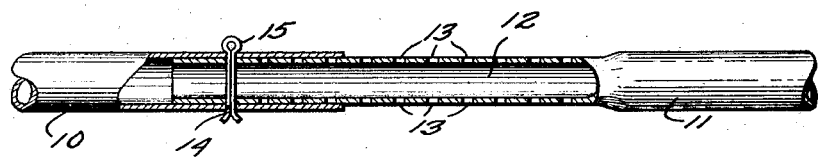
Figure 4 is a fragmentary view in part elevation and part section of an adjustable portion of the visor frame.

In the drawings where similar characters designate like or similar parts throughout the views, A designates the body portion of a motor vehicle; B and C, upper and lower wind shield panels respectively; D the standards supporting the panels B and C; and E an adjustable visor constructed according to the present invention and which comprises broadly a frame F and upper and lower panels G and H, respectively, carried by the frame, the latter of which may be dispensed with, if desired, as hereinafter noted.

While the invention is herein shown and described as applied to a motor vehicle of the so called open type, it is to be understood that the visor may be applied to other types of vehicles having uprights which are the equivalent to the standards D.

The frame F comprises a relatively long front member 7, which may be considered as a compression member, being, in the example shown, subjected to compression, when in use, and upper and lower side members 8 and 9, respectively extending rearwardly from each end portion of the front member 7. In order that the front member 7 may be adjusted longitudinally, so as to adapt the visor for use in connection with any particular make or model of vehicle, and according to the width of the wind shield, this member may comprise parts 10 and 11 which, in the example shown, are of tubular formation, one end portion of part 11 being reduced in diameter as at 12 and telescoping in an end portion of part 10. The reduced portion 12 may be provided with a plurality of apertures 13 in spaced apart relation longitudinally of part 11 and in diametrically opposite pairs, while part 10 may similarly be provided with perforations 14 for the reception of a key or cotter pin 15, which also passes through selected perforations 13, to hold the parts 10 and 11 in rigid adjusted relation. The opposite end portions of parts 10 and 11, to those which are in telescopic relation, are provided with recesses 16, for a purpose to be subsequently set forth. The end members 8 and 9 may also be rendered adjustable longitudinally by each comprising separable parts 17 and 18 and a coupling 19 adapted to hold the parts 17 and 18 in rigid adjusted relation. The coupling 19 may comprise a body portion 20 having two parallel ways 21 therethrough, with set screws 33 adapted to engage the parts 17 and 18 which pass through the ways 21, so as to hold them in fixed relation to the body 20.

Figure 6:
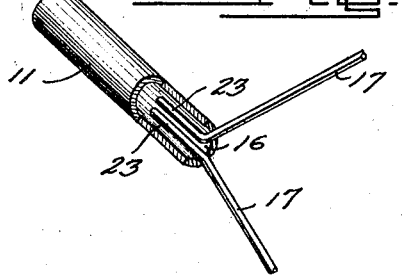
Figure 6 is a fragmentary perspective view of a corner portion of the visor frame, a portion being broken away to disclose a preferred assemblage.

It is desirable that the upper and lower side members 8 and 9 be swingeable toward and from each other, and as an economical arrangement to accomplish this, the parts 17 may have inwardly extending projections 23, as clearly shown in Figure 6, which extend into the recess 16 in front member 7. The parts 18 may be provided with suitable offset heads 24, which are at the free end portions of the side members, these heads being adapted to frictionally engage the upright or standard D as hereinafter noted. These offset heads may be provided with friction pads 25, of leather, rubber, or other suitable material, which may be forced into intimate contact with the uprights or standards D, but not to mar same. The coupling 19 has a dual function, — to retain the parts 17 and 18 in adjusted relation longitudinally, and also to permit the part 18 to be rotated, so that the offset head 24 may be positioned extending toward the center of the visor, or swung to another position, to facilitate placing of the visor into operative relation to the vehicle, after which it may be swung so that the head tightly engages an upright of the vehicle, so as to hold the visor in place, after which the set screw 22 which engages part 18 is adapted to firmly hold the part 18 against rotation.

The upper panel G of the visor is made relatively wide and is supported by the front member 7, and upper side members 8, and in practice is disposed with its rear margin as close as possible to the wind shield of the vehicle. This pannel G serves to protect the windshield panel C against accumulation of rain water, ice, or snow, during stormy weather, and in fair weather renders driving less fatiguing, acting as it does as a sun shield. It is preferably made of flexible material, and may be made of transparent material with the added advantage that the line of vision may be directed through it, if desired. If made transparent, it is preferred to color the transparency either light green, or amber, so as to act as a non-glare shield between some bright light and the driver. In the example shown this panel G is disposed between the upper side members 8, and may rest upon the front member 7. If desired, it may be provided with a depending stay 26, disposed at its front marginal portion preferably mid way of its ends, this stay being provided with a slot 27, through which a ribbon or other flexible member 26' may pass, being bound around the front member 7. This stay serves to steady the panel G, if made of flexible material, so that it will not vibrate due to wind forces coming thereupon, to any extent, or due to vibration of the vehicle in travel over highways. It may also serve to cause the central portion of the panel to be slightly higher than the end portions, so that there will be a tendency for water to flow to the ends of the panel. Vibration or flapping of the panel may also be prevented by the provision of longitudinally extending flanges 28 and 29, the former being at the forward edge of the panel, and upturned, so as to form with the main body portion of the panel, a trough, causing the water to flow from the panel only at the end portion thereof, where splashing against the windshield is avoided. The flange 29 also serves to prevent flow of water over the rear margin of the panel, such as might otherwise occur when traveling forwardly in a driving rain. If desired, the end marginal portions of the panel may be reinforced by strips 30, cemented, or otherwise secured to the main body portion of the panel. The panel is preferably retained in position between the upper side member 8, as by flexible members 31, such as cords or leather, passing through perforations 32 in the side marginal portions of the panel G. Any suitable number of flexible members 21 may be provided and in practice they are drawn and tied about the upper side members 8, so as to draw the panel taut, and also serve to hold the inturned projections 23 and the heads 24 of the uper side members in proper position with respect to the front member 28 and upright D, respectively.

The lower panel H which may be very similar to panel G, but relatively narrower, may also be provided with forward flange 33 extending longitudinally thereof, and rear flange 34, also extending longitudinally thereof, and may be provided with end reinforcing strips 35, cemented or otherwise secured to the main body portion of the panel. The forward flange 33 may be upturned, so as to more effectively shed any water which may splash upwardly against the under side of the panel, and due to wind forces move toward the forward margin of the panel. It is preferred to downturn flange 34, so that it may effectively shed water which may flow downwardly on the lower face of panel H. Panel H is secured to the lower side member 9, in the example shown, by flexible elements 36 which pass through perforations 37 in the end portion of the panel, and these flexible elements function similarly to flexible element 31. The panel H being relatively narrower than panel G is preferably disposed with its forward margin spaced from the forward margin of panel G, thus providing a slit, or opening 40, through which the line of vision may be directed, when the panels are in the relative position shown by full lines in Figure 2 of the drawings. In other words, the upper and lower side members may be so positioned in forward converging relation that a normal line of vision of the driver may be directed through this slit or opening 40, but if facing a strong light, the driver may move slightly so that the line of vision to the strong light is either cut off by one or the other of the panels G or H, or if made of transparent material the line of vision may be directed through either panel G or H.

An inexpensive way of forming the head 24 may be to make the parts 18 of wire, of suitable gauge, doubled upon itself as at 41, to form a hand hold, and then arcuated as at 42, so as to more readily conform to the shape of the usual windshield standards D.

In practice, it is not necessary to carry in stock a number of sizes of visors, for being adjustable, it is possible to set up the visor and adjust it, knowing the distance between the outer faces of the uprights D, and then apply the visor to the vehicle by disposing the heads 24, so that they are not in confronting relation. The visor may then be slipped into place, and the parts 18 turned about their axes so that the inturned head 24 will firmly engage the upright D. During fair weather it may be desirable to dispose the panel H, so that the line of vision will not be directed therethrough, or obstructed thereby, if made of opaque material, and this may be accomplished by grasping the hand holds 41 of the lower side members 9, and forcing same upwardly to a position as indicated by dotted lines in Figure 3. Very little effort is required in order to accomplish this, and the lower panel may be readily moved downwardly in a similar manner. While the lower panel may be dispensed with, and the lower side member 9 connected by some contacting element, so as to hold them firmly against the upright C, the advantages of the lower panel offset any added cost in production, yet it is to be observed that the upper panel alone may be used if desired. The lower panel not only functioning to prevent splash of water against the windshield, which may beat upon the hood of the vehicle and then splash upwardly, constitutes a very important part of the invention and may be applied for use in conjunction with visors which may have been previously installed.

Changes in details may be made without departing from the spirit or scope of my invention; but,

I claim:

1. An adjustable visor comprising in combination, a frame including a front compression member and upper and lower side members at each end portion of said compression member, the upper and lower side members at each end of the visor swingable toward and from each other with the fulcrum at the end portion of said compression member, a flexible panel fitting between the upper side members and a flexible panel fitting between the lower side members, and flexible devices connecting the side members and end portions of their respective panels, said flexible devices having a tendency to draw the free end portions of opposite side members toward each other and retain the flexible panels taut, when an object is interposed between the free end portions of said side members.

2. An adjustable visor comprising in combination, a frame including a front compression member, upper and lower side members at each end portion of said compression member, the upper and lower side members at each side of the visor swingable toward and from each other with the fulcrum at the end portion of said compression member, said end members each including an offset head at its free end portion adapted to be swung toward and from its companion offset head and retained in fixed relation to its portion engaging the front compression member, and flexible devices connecting the side members and end portions of their respective panels, said flexible devices having a tendency to draw the free end portions of opposite side members toward each other and retain the flexible panels taut, when an object is interposed between the free end portions of said side members.

3. An adjustable visor comprising in combination, a frame including a front compression member, and longitudinally adjustable upper and lower side members at each end portion of said compression members the upper and lower side members at each end of the visor swingable toward and from each other with the fulcrum at the end portion of said compression member, a flexible panel fitting between the upper side members and a flexible panel fitting between the lower side members, and flexible devices connecting the side members and end portions of their respective panels, said flexible devices having a tendency to draw the free end portions of opposite side members toward each other and retain the flexible panels taut, when an object is interposed between the free end portions of said side members.

4. An adjustable visor comprising in combination, a frame including a longitudinally adjustable front compression member and longitudinally adjustable upper and lower side members at each end portion of said compression member, the upper and lower side members at each end of the visor swingable toward and from each other with their fulcrum at the end portion of said compression member, said end members each including an offset head at its free end portion adapted to be swung toward and from the center and retained in fixed relation to its portion engaging the front compression member, a flexible panel fitting between the upper side members and a flexible panel fitting between the lower side members, and flexible devices connecting the side members and end portions of their respective panels, said flexible devices having a tendency to draw the free end portions of opposite side members toward each other and retain the flexible panels taut, when an object is interposed between the free end portions of said side members.

5. In an adjustable visor, the combination of a frame including a front compression member and end members extending rearwardly from the end portions of said compression member, and heads carried by the free end portions of said members adapted to frictionally engage the outside faces of the windshield standards, a flexible panel fitting between said end members of the frame, and flexible devices connecting the end portions of said flexible panel to said end members, having a tendency to draw the said heads toward each other and retain the flexible panel taut when the said heads engage the windshield standards.

6. In an adjustable visor, the combination of a frame including a front compression member and end members extending rearwardly from the end portions of said compression member, said end members each including an offset head at its free end portion adapted to be swung toward and from its companion offset head and retained in fixed relation to its portion engaging the front compression member, a flexible panel fitting between said end members of the frame, and flexible devices connecting the end portions of said flexible panel to said end members, having a tendency to draw the free end portions thereof toward each other and retain the flexible panel taut when an object is interposed between the free end portions of said end members.

7. In an adjustable visor, the combination of a frame including a front compression member and longitudinally adjustable end members extending rearwardly from the end portions of said compression member, said end members each including an offset head at its free end portion adapted to be swung toward and away from its companion offset head and retained in fixed relation to its portion engaging the front compression member, a single flexible panel fitting between said end members of the frame, and flexible devices connecting the end portions of said flexible panel to said end members, having a tendency to draw the free end portions thereof toward each other and retain the flexible panel taut when an object is interposed between the free end portions of said end members.

8. An adjustable visor comprising in combination, a frame including a front compression member having recesses at its end portions and upper and lower side members at each end portion of said compression member, the upper and lower side members at each end portion of the compression member having inwardly extending projections fitting into the adjacent recesses of the latter and forming a pivotal connection therewith, whereby the upper and lower side members may be swung toward and away from each other, a flexible panel fitting between the upper side members and a flexible panel fitting between the lower side members, and flexible devices connecting the side members to the end portions of their respective panels, said flexible devices having a tendency to draw the opposite side members toward each other and retain the flexible panels taut when an object is interposed between the free end portions of said side members.

9. An adjustable visor for vehicles comprising in combination, a frame including a front member and upper and lower side members at each end portion of said front member, the upper and lower side members at each end of the visor swingable toward and from each other with their fulcrums at the end portion of said front member, said side members each including an offset head at its free end portion adapted to be swung toward and from its companion offset head and retained in fixed relation to its portion engaging said front member, said head adapted to frictionally engage an upright of the vehicle, and a panel carried by said front and upper side members of said frame.

10. An adjustable visor comprising in combination a frame including a front member and upper and lower side members at each end portion of said front member, the upper and lower side members at each end of the visor swingable toward and from each other with their fulcrum at the end portion of said front member, a relatively wide panel carried by said front and upper side members, and a relatively narrow panel carried by said lower side members and disposed closer to the free ends thereof than said front member.

ELMER HIATT.